United States Patent [19]

Bucheli

[11] 4,002,100
[45] Jan. 11, 1977

[54] EXPANSION ANCHOR SLEEVE AND METHOD OF MAKING THE SAME

[75] Inventor: Josef Bucheli, Herrliberg, Switzerland

[73] Assignee: Tuflex AG, Glattbrugg, Switzerland

[22] Filed: May 30, 1975

[21] Appl. No.: 582,282

[30] Foreign Application Priority Data

June 5, 1974 Switzerland .................. 7708/74

[52] U.S. Cl. .................................................. 85/85
[51] Int. Cl.² ......................................... F16B 13/06
[58] Field of Search ................. 85/85, 87, 84, 74

[56] References Cited

UNITED STATES PATENTS

| 917,907 | 4/1909 | Taylor | 85/85 |
|---|---|---|---|
| 1,372,035 | 3/1921 | Ogden | 85/85 |
| 1,821,401 | 9/1931 | Peirce | 85/85 |
| 3,468,091 | 9/1969 | Gerhard | 85/80 X |
| 3,577,825 | 5/1971 | Reusser | 85/85 X |

FOREIGN PATENTS OR APPLICATIONS

| 111,449 | 9/1967 | Norway | 85/85 |
| 319,871 | 4/1957 | Switzerland | 85/85 |

Primary Examiner—Ramon S. Britts
Attorney, Agent, or Firm—Michael J. Striker

[57] ABSTRACT

A metal expansion anchor sleeve is made by forming an elongated flat sheet metal blank so that it has a longitudinal slot extending inwardly from one of its ends and dividing it into two sections which are connected at the other end and which are each provided with a projecting tongue located in the region of the one end. Each tongue is thereupon bent back onto the respective blank section so that its free end moves through more than 180°, the bending being over a radius equal to at least half the thickness of the blank. The blank is then arcuately bent transversely to the elongation of the slot and formed into an externally substantially cylindrical expansion anchor sleeve having an inner longitudinal passage which, due to the presence of the tongues, diverges in direction away from the one end, i.e., converges towards the one end which is the leading end of the sleeve.

9 Claims, 20 Drawing Figures

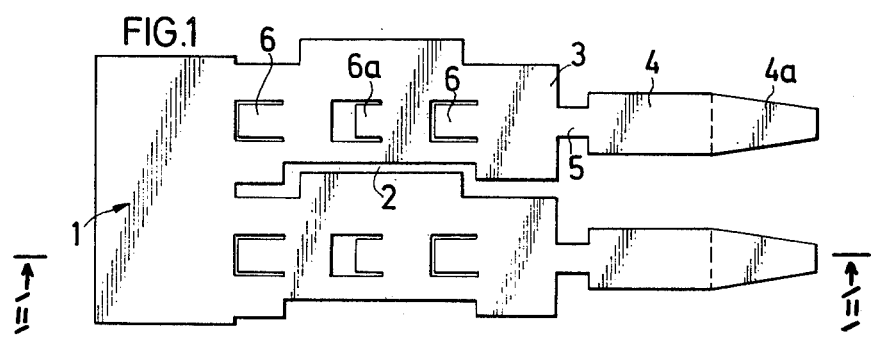
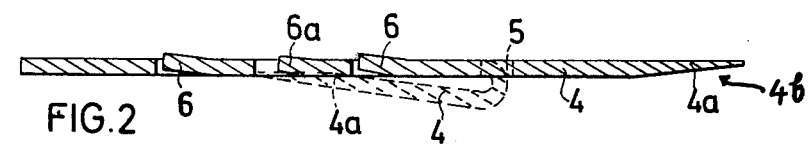
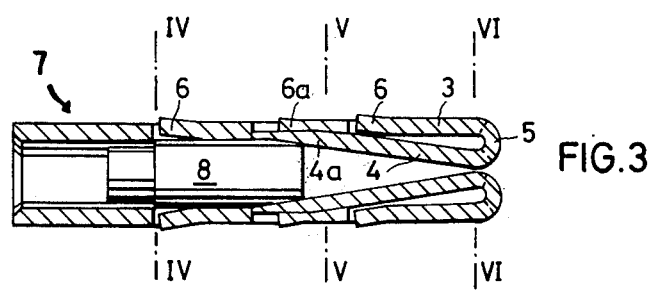
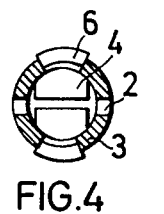
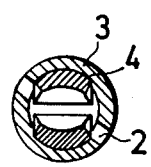
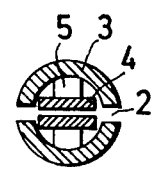
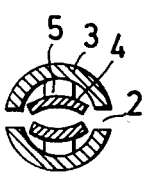

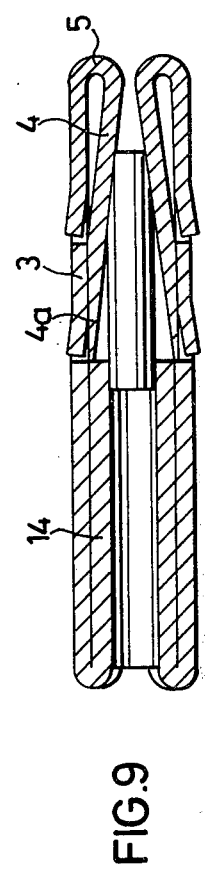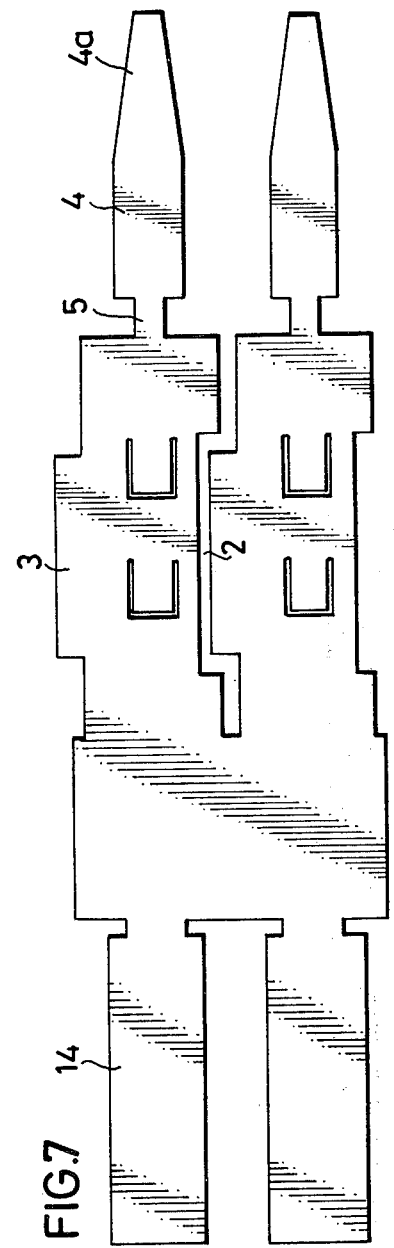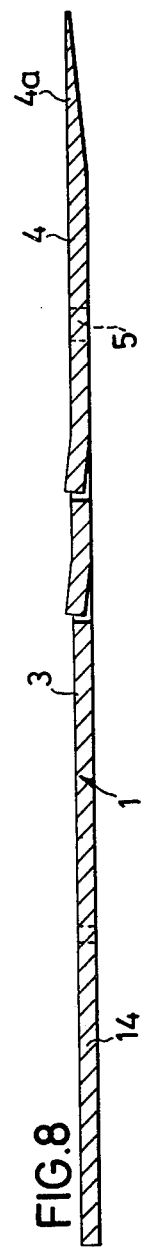
FIG.9
FIG.7
FIG.8

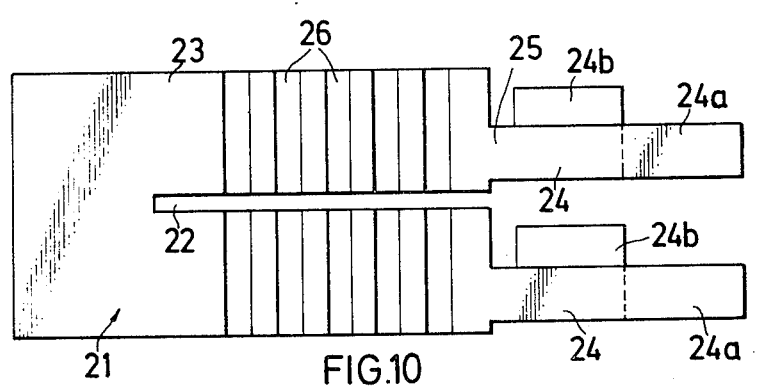
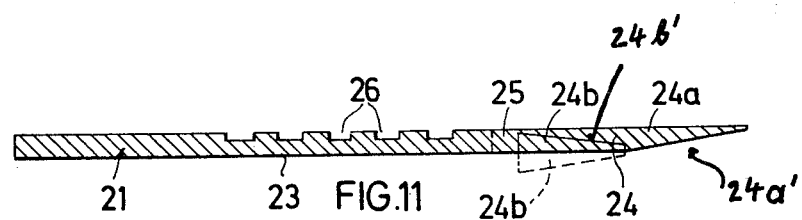
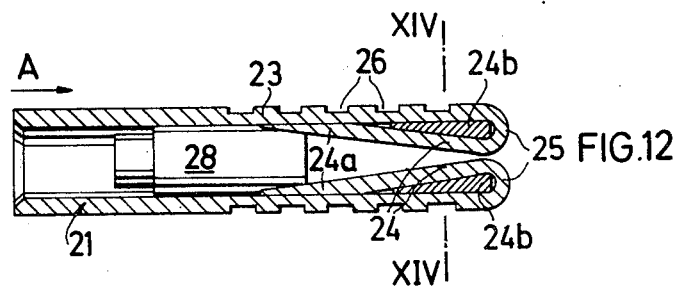
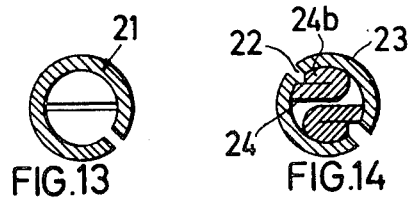

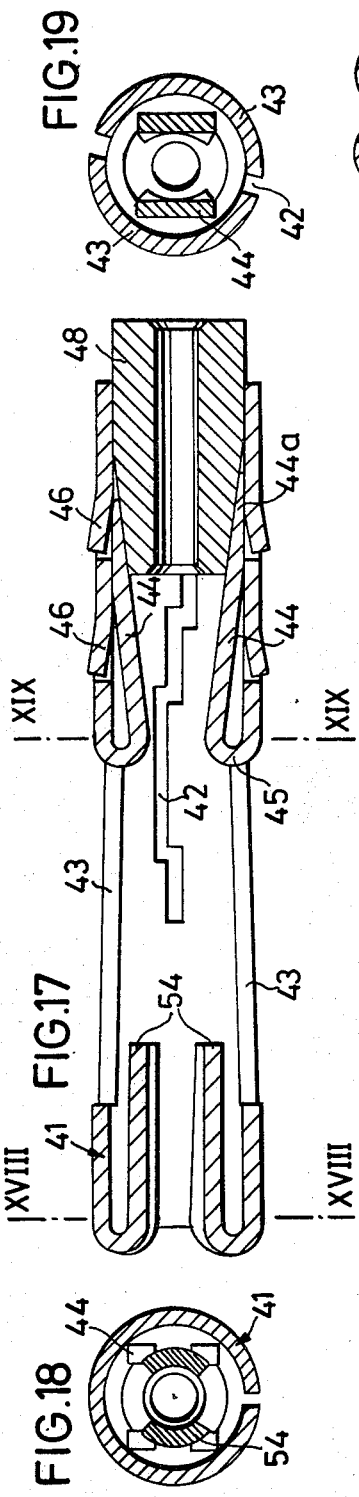
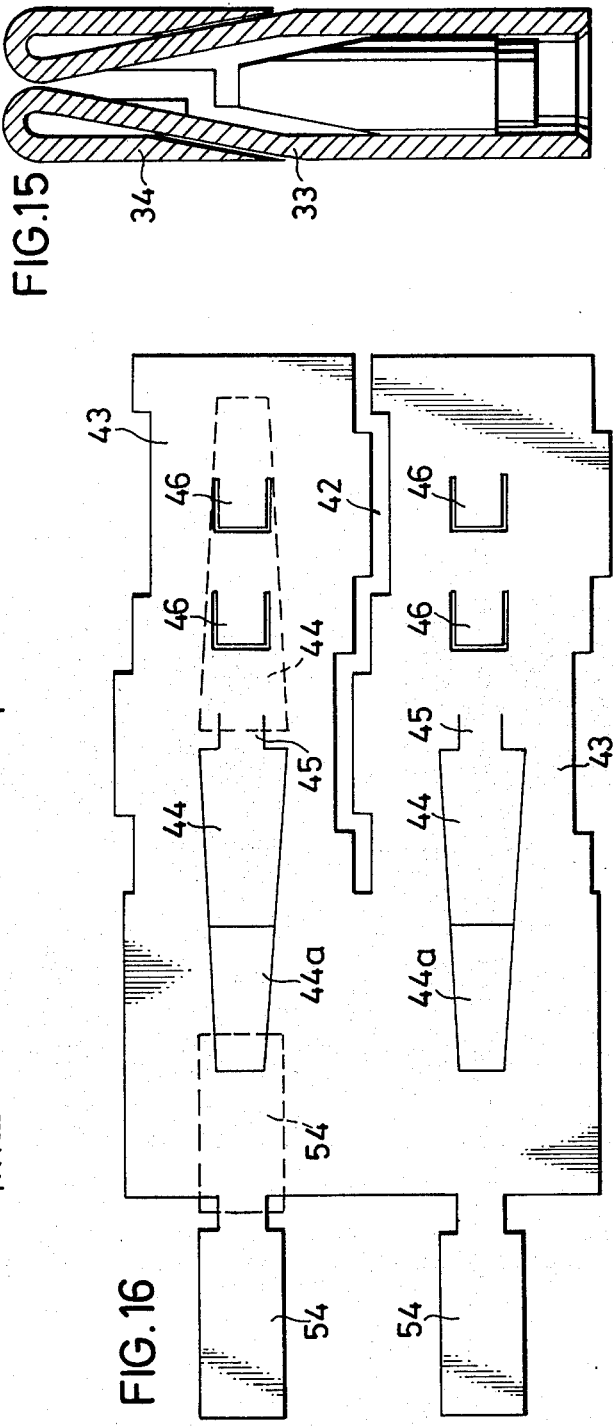

EXPANSION ANCHOR SLEEVE AND METHOD OF MAKING THE SAME

BACKGROUND OF THE INVENTION

The present invention relates to expansion anchors in general, and more particularly to a metal expansion anchor sleeve, and to a method of making the same.

Expansion achor sleeves, which are used in conjunction with expander elements to anchor them in holes of a supporting structure, are already known in a great variety of different types. Usually they are made of synthetic plastic material because this permits the manufacture of such sleeves in a simple and inexpensive manner, enabling any desired configuration as to the number of slots, the provision of lugs for preventing rotation, the formation of screw threads and the like. All of this can be produced in one operation, since these plastic expansion anchor sleeves are usually produced by injection molding.

However, expansion anchor sleeves of synthetic plastic material suffer from considerable disadvantages. A particular drawback is that if they are used as elements for anchoring suspended ceilings and the like, they are readily destroyed by heat, for example in the event that fire should break out. This then permits the suspended element, such as a ceiling or the like, to drop, and to cause further damage and destruction beyond that caused by the fire.

It is also known to make expansion sleeves from metallic material. However, the prior art suggests producing these sleeves by turning them on a lathe, and this and subsequent operations which are necessary to produce such a metal expansion anchor sleeve, greatly increases the cost of manufacturing the same.

SUMMARY OF THE INVENTION

Accordingly, it is an object of the present invention to overcome the disadvantages of the prior art.

More particularly, it is an object of the present invention to provide an improved metallic expansion anchor sleeve.

More particularly, it is an object of the invention to provide such an improved metallic expansion anchor sleeve which meets all requirements made of such sleeves but can nevertheless be produced simply and inexpensively.

Another object of the invention is to provide an improved method of producing such a metal expansion anchor sleeve.

In keeping with these objects, and with other which will become apparent hereafter, one feature of the invention resides in a method of producing an expansion anchor sleeve which, briefly stated, comprises the steps of providing an elongated flat sheet metal blank having a longitudinal slot extending inwardly from one blank end and dividing the blank into two sections which are connected at the other blank end and which are each provided with a projecting tongue in the region of the one end. Each tongue is bent back onto the respective blank section through more than 180° and over a bending radius equal to at least half the thickness of the blank, and thereupon the blank is arcuately bent transverse to the elongation of the slot and formed into an externally substantially cylindrical expansion anchor sleeve having an inner longitudinal passage.

The tongues may be bent inwardly or outwardly of the sleeve being formed, and they may be present in the workpiece blank as extensions of the aforementioned blank sections or may be stamped out from the base area of these sections themselves. In each case, at the bend forming one of the ends of the sleeve and the radius of which is always greater than zero since the bend is not a sudden sharp one, the wall of the sleeve is of greater thickness than at the region thereof where the free end of each tongue overlies the respective blank section and where the combined thickness of the free end and the respective blank section is at most double the thickness of the wall. The greater wall thickness at the end of the sleeve where the tongues are bent over result from the increase thickness due to the presence of the tongues which is equal to twice the radius of the bend. The additional material is located at the interior of the sleeve so that the longitudinal passage of the sleeve narrows between the tongues towards one or the other end of the sleeve, i.e. towards the leading or trailing end thereof.

The metallic expansion anchor sleeve produced in accordance with the present invention is configurated as a tubular cylinder which is open along a generatrix and which has at least two expansible sections which are separated from one another by a slot extending from one end of the sleeve, the wall thickness of the sleeve being increased by the aforementioned tongues that are integral with and back onto the sections. The longitudinal passage of the sleeve converges towards the area where the tongues are bent over.

To produce this sleeve, only three simple basic operations require to be carried out: the workpiece blank is punched, cut or stamped from a sheet of strip of sheet metal, and during this operation it is also possible, if desired, to form on the blank any required tabs for preventing rotation and/or annular ribs for preventing extraction and/or internal screw thread for a screw cooperating with the sleeve. In the next operation the tongues are bent back, and finally the blank is bent transversely to the desired sleeve-shaped or tubular configuration. The starting material for the manufacture of the novel sleeve is always a simple flat piece of sheet metal of suitable thickness, and it is clear that extensive machining operations are avoided in the present invention, in contradistinction to the manufacture of prior-art metallic expansion anchor sleeves.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a plan view illustrating a punched blank of one embodiment;

FIG. 2 is a section taken on line II—II of FIG. 1;

FIG. 3 is an axial section of an expansion anchor sleeve produced from the blank of FIGS. 1 and 2, with an expanding member shown inserted into the sleeve;

FIGS. 4, 5 and 6 are cross-sections through the sleeve of FIG. 3, taken on lines IV—IV, V—V and VI—VI, respectively, but with the expanding member of FIG. 3 omitted;

FIG. 6a shows a section similar to that of FIG. 6, but illustrating a somewhat modified embodiment;

FIG. 7 is a view similar to FIG. 1, illustrating a blank of a further embodiment;

FIG. 8 is a view similar to FIG. 2, but of FIG. 7;

FIG. 9 is a view similar to FIG. 3, but of a sleeve produced from the blank in FIGS. 7 and 8;

FIG. 10 illustrates a blank for producing a third embodiment of a sleeve according to the present invention, in a view similar to FIG. 1;

FIG. 11 is a view of the blank of FIG. 10, in a view similar to that of FIG. 2;

FIG. 12 is an axial section through a sleeve produced from the blank in FIGS. 10 and 11;

FIG. 13 is a cross-section through the sleeve in FIG. 12, looking in the direction of the arrow A;

FIG. 14 is a section taken on line XIV—XIV of FIG. 12;

FIG. 15 is an axial section through a sleeve according to a further embodiment of the invention;

FIG. 16 is a plan view of a blank for producing a sleeve according to still another embodiment of the invention;

FIG. 17 is an axial section through a sleeve produced from the blank in FIG. 16;

FIG. 18 is a section taken on line XVIII—XVIII of FIG. 17; and

FIG. 19 is a section taken on line XIX—XIX of FIG. 17.

DESCRIPTION OF THE PREFERRED EMBODIMENTS

Referring firstly to the embodiment illustrated in FIGS. 1–6 it will be seen that the starting material for producing the sleeve shown in FIGS. 3–6 is a blank 1 that is shown in FIGS. 1 and 2 and is produced by cutting, stamping or punching the blank 1 from a piece of flat sheet metal. At the same time as the blank 1 is produced out of the piece of sheet metal, a meandering slot 2 can also be formed, which starts at one end of the blank 1 and divides the same into two similar portions or sections 3 which are interconnected at the other end of the blank and whose outer edges have the configuration shown in FIG. 1. At the open end of the slot 2 each portion 3 is provided with a reduced-width neck 5 that connects a projecting tongue 4 to the respective section 3. Each tongue 4 has a free end portion 4a whose thickness tapers, as indicated at 4b in FIG. 2, at that side of the tongue 4 which is to be folded back upon the associated blank section 3. In addition, the width of the tongue end portion 4a also tapers in direction away from the associated blank section 3.

Each of the sections 3 is also formed with several (in this case 3) tabs 6, 6a which are arranged in a row and which are formed by punching, these tabs 6, 6a being bent slightly upwardly and out of the plane of the respective blank section 3 (compare FIG. 2) and having free ends which face away from the tongues 4.

The blank shown in FIGS. 1 and 2 can be produced in a single operation, by stamping or in one of the other ways mentioned earlier.

In the next operation the tongues 4 are bent back upon their respectively associated blank sections 3, i.e. in FIG. 2 they are bent downwardly and then upwardly until they assume the broken-line position shown in FIG. 2. The bending is over a relatively large bending radius corresponding to at least one-half of the thickness of the blank 1 and, because of the taper or chamfer 4b each tongue 4 can be bent through more than 180° of arc until the inclined surface of the taper 4b comes in contact with the associated blank section 3. The now rearwardly pointing tip of the blank end portion 4a is substantially flush with the underside of the blank section 3 upon which it is bent back.

In the next and final operation the now semi-finished blank is converted into the expansion anchor sleeve by arcuately deforming it transversely of its elongation and of the elongation of the slot 2, forming a sleeve 7 which is externally substantially cylindrical. The deformation is so chosen that the tongues 4 will become located at the inside of the sleeve 7, as shown in FIG. 3 and will bound in the expansion part of the sleeve, i.e. the part where the slot 2 is present, a portion of the sleeve passage which converges in direction towards the leading end of the sleeve, i.e. the right-hand end of FIG. 3 which is the end that is to be first inserted into an anchoring hole. It will be understood that the sleeve is circumferentially incomplete, having an open slot along one of its generatrix where the two opposite lateral edges of the original blank become juxtaposed when the blank is deformed to the tubular configuration in FIG. 3.

As the cross-sectional views in FIGS. 5 and 6 show, the rear free end portions 4a of the tongues 4 are also slightly rounded during the deformation of the blank to the tubular configuration shown in FIG. 3, whereas those parts of the tongues 4 located in the zone of the leading end portion of the sleeve 7 remain flat.

To utilize the sleeve 7 of FIG. 3 it is now merely necessary to insert an expander element 8, having a rearwardly converging front end as shown in FIG. 3, into the sleeve from the trailing end thereof, and to drive it in the passage of the sleeve 7 towards the leading end (the right-hand end of FIG. 3), so that it causes the sleeve 7 to become expanded. The driving may be effected by any suitable means, for example by means of an appropriate ram which does form a part of the expansion anchor, or the passage of the sleeve 7 may be formed in the region of its trailing end with internal screw threads into which a screw can be threaded which then exerts forward pressure upon the expander element 8.

If the sleeve 7 of FIG. 3 is to be secured in a relatively yieldable material, for example, in wallboard, in a synthetic plastic building material or in a hollow concrete block or similar material, the sleeve will become expanded to a relatively great extent as the expanding member 8 is driven into it over only a short distance of the sleeve length, because the expanding portions of the sleeve 7 immediately dig into the surrounding material. The tabs 6 and 6a act to prevent rotation of the sleeve 7 as the member 8 is driven in. If, on the other hand, the sleeve 7 is to be installed in an expansion anchor hole in a relatively hard material, for example a masonry wall or the like, the tongues 4 first become deformed and fully pressed against the inner surfaces of the respective sections 3 before the outward expansion of the sleeve 7 begins. Whether this pressing of the tongues 4 against the inner surfaces of the sections 3 occurs at an early or at a later stage of the driving of the expander member 8, depends largely upon the width of the neck 5, i.e. upon the resistance opposed to this deformation by the neck 5. It will be clear that largely dependent upon the selection of the width of the neck 5 it is thus readily possible to produce the sleeve 7 either for general use, for four specialized uses, i.e. so that it is particularly suited for use in resilient material or is particularly suited for use in hard material.

FIGS. 4–6 show that the part of each tongue 4 which bears against the associated blank section 3 becomes curved (compare FIG. 5) when the blank is deformed to the sleeve configuration of FIG. 3, whereas the part of each tongue that is immediately adjacent the bend at neck 5 remain flat, as seen in FIG. 6. However, as FIG. 6a shows, it is possible to modify this embodiment and to impart a slight curvature to the aforementioned part of the tongues 4 also, in order to facilitate penetration of the expander member 8. This curving of the parts of the tongues 4 adjacent the neck 5 (FIG. 6a) may be carried out on the blank 1 during or after the punching operation during which the blank 1 is produced.

In many instances it is desired or necessary to form at the trailing end of the sleeve an internal screw thread, into which a screw can be threaded which is used for forwardly advancing the expander member 8 and/or for fixing an object which is to be held in place by means of the sleeve. In order not to have to reduce the strength of the trailing end portion of the sleeve in undesirable manner by forming it with the screw thread, this trailing end portion can be reinforced,. For this purpose the blank 1 shown in FIGS. 7 and 8 may additionally be provided with tongues 14 which project from the rear ends of the blank sections 3 to which they are connected by narrow necks. These tongues are then bent back to lie flat on the respective section 3 and when the blank is subsequently formed to the tubular shape shown in FIG. 9, they will reinforce the wall of the sleeve at the trailing end thereof, providing a double-thickness wall in which a screw thread can be formed without weakening the wall. This screw thread can be produced either after the sleeve is completed as shown in FIG. 9, or it can even be pressed into the tongues 14 before they are bent back. In all other respects, the embodiment in FIGS. 7–9 corresponds to that in FIGS. 1–6.

In FIGS. 10–14 I have illustrated an expansion anchor sleeve which is particularly well suited for use in a supporting structure which is of relatively soft material. Again a blank 21 is formed from a sheet metal strip or sheet and is provided with the longitudinal slot 22 which, in this case, is straight rather than meandering. The slot 22 divides the blank 21 into two sections 23 that are connected at the left-hand end of the blank 21 which will later become the trailing end of the sleeve (compare FIG. 12). Each of the sections 23 is provided with a forwardly projecting tongue 24 which is again chamfered at its front end portion 24a, as indicated by reference numeral 24a' in FIG. 11. In addition, each tongue 24 has a laterally projecting tab 24b that is formed integrally with it close to the region 25 where the tongue 24 is connected with the respective blank section 23. That surface of each of the blank sections 23 that is intended to form part of the outer surface of the finished sleeve is formed with impressed transverse anti-extraction depressions or channels 26. Each of the tabs 24 has a forwardly extending chamfer on its upper face and, prior to the bending-back of the tongues 24 upon the respective blank sections 23, each lateral tab 24b is bent over from the full-line position in FIGS. 10 and 11 to the broken-line position shown in FIG. 11, so that it is located beneath its respective tongue 24 in engagement with the underside thereof. Subsequently the tongues 24 are bent back at their necks 25 onto the respective blank section 23, and in so doing the lateral tabs 24b fill the internal cavities between the tongues 24 and the respective blank sections 23 (compare FIG. 12), which cavities were left hollow in FIGS. 1–3. In this embodiment the forward advancement of the expanding member 28 in FIG. 12 will result in immediate radially outward expansion of the sleeve. FIGS. 13 and 14 are sections through FIG. 12 and show internal details of the sleeve.

In the preceding embodiments the tongues 4 or 24 on the respective blank are bent back upon that surface of the blank which ultimately will become the inner surface of the finished sleeve. Particularly when, as in FIG. 12, the free ends of the tongues are not depressed into openings which are formed when the tabs 6, 6a (see FIGS. 1 and 2) are formed, these free ends can impede the forward movement of the expanding member 8 or 28, because they point in direction opposite this forward movement. To prevent this possibility, FIG. 15 illustrates an embodiment in which the tongues 34 are bent back towards the exterior of the sleeve that is being formed and onto the portions 33, which are the blank sections corresponding, for example to the blank sections 3 of FIG. 1. When thereupon the blank is deformed to the sleeve-shaped configuration, those areas of the sections 33 in the region of the tongues 34 are pressed inwards to produce a tapered formation, so that they delimit the sleeve cavity which tapers or converges in direction towards the leading end of the sleeve. To fill up the cavity between the tongues 34 and the tapered inner wall of the sleeve that results from the relatively large bending radius of the tongues 34, suitably chamfered lateral tabs corresponding to the tabs 24b of FIG. 10, can be formed on the tongues 34 and bent back onto them, as described with reference to the embodiment of FIG. 10.

In all of the embodiments thus far described I have explained expansion anchor sleeves in which the internal sleeve passage converges towards the leading end of the sleeve, and in which an expanding member introduced at the trailing end of the sleeve is to be driven forwardly towards the leading end, in order to cause the sleeve to become expanded and be secured in an expansion anchor hole. By contrast, FIGS. 16–19 illustrate an embodiment of my invention in which the expansion of the anchor is achieved by an expanding member 48 which is to be drawn into the sleeve from the leading end thereof, by means of an element (e.g. a screw) that is inserted through the sleeve from the trailing end thereof.

The embodiment of FIG. 16 is produced in the same manner as the other embodiments, i.e. a blank (FIG. 16) is produced from a flat piece of sheet metal and is separated into two portions or sections 43 by a meandering longitudinally extending slot 42. The sections 43 are connected at the left-hand end of the blank in FIG. 16. Tongues 54 extend at the left-hand end from the blank sections 43 and are connected to them by means of narrow necks. Two tabs 46 are provided, being punched out of each of the blank sections 43. In addition, rearwardly of the tabs 46 (i.e. in direction towards that end of the blank which will be the trailing end of the sleeve when the latter is formed, a short tongue 44 having an adjoining neck 45 and tapering slightly in the left-hand direction, is formed by punching in each section 43 of the blank. At its free end portion 44a each of the tongues 44 is again chamfered on that surface which is intended to form the inner surface of the sleeve, in the manner described with reference to numeral 4b in FIG. 2. Each of the tongues 44 is now bent over and back upon its associated section 43 until its chamfered end portion 44a is in contact with the section 43, as shown in broken lines in FIG. 16, the bend being made at the neck 45 in a way relatively large bending radius which is equal to at least one-half of the wall thickness of the blank. Additionally, each tongue 54 is bent through 180° so that it lies flat upon the inner face of the respective section 43, as is also shown in broken lines in FIG. 16.

The thus prepared semi-finished blank is now converted into the tubular sleeve shown in FIGS. 17, 18 and 19 by deforming it transversely to the elongation of the slot 42 and giving it a tubular configuration so that it has a substantially cylindrical outer surface. During this bending operation the tongues 54, which preferably prior to being bent over, are curved to a part-cylindrical shape and, if required, may be provided with an internal screw thread in advance, from a lead-in bore or passage for a screw (not shown) the forward end of which can be moved into engagement with an internal screw thread (not shown) formed in the expander member 48 so that, when this screw is turned in requisite direction and prevented from axial shifting, it will draw the expander member 48 leftwards in FIG. 17 into the sleeve, expanding the same in the desired manner. The tongues 44 define a guide passage which converges in an opposite sense to that of the preceding embodiments, i.e. which converges towards the trailing end of the sleeve, and which guides the expander member 48 during the entry thereof into the sleeve and the expansion of the sleeve by the expander member.

The expansion anchor sleeve according to the present invention, and the method of making it, are characterized by extreme simplicity. This means that the sleeve can be produced inexpensively and very rapidly, and only very small amounts of simple sheet metal are required to produce the sleeve. Moreover, experience has shown that this sleeve can be used in virtually every application where expansion anchors can be employed, so that it is obviously highly versatile.

It will be understood that each of the elements described above, or two or more together, may also find a useful application in other types of constructions differing from the types described above.

While the invention has been illustrated and described as embodied in a metallic expansion anchor sleeve, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A metal expansion anchor sleeve, comprising a sheet-metal sleeve body open along a generatrix thereof and having at least two radially outwardly expansible sections separated by a slot extending from one end of the sleeve body, said sleeve body also having a longitudinal passage for insertion of an expander member, and said sleeve body further having tongues integral with one end of the sleeve body and bent back upon the respective sections inwardly of said sleeve and forming a bight-shaped leading end portion which has a radius of curvature equal to at least one-half of the thickness of a respective section, each tongue including a tapered free end portion bounded by two mutually converging surfaces one of which is inclined relative to the other, said one inclined surface facing and engaging the inner surface of said longitudinal passage defining a tapered continuation thereof, the respective tongue being bent back through an arc of more than 180° providing unobstructed entry of the expander member into said passage.

2. A metal expansion anchor sleeve as defined in claim 1, wherein said passage converges in direction towards said one end.

3. A metal expansion anchor sleeve as defined in claim 1, said sleeve body further comprising neck portions narrower than said tongues and joining the same to said one end.

4. A metal expansion anchor sleeve as defined in claim 1, wherein said one end is the leading end of said sleeve body, and said tongues are bent inwardly of said sleeve body in direction towards the other end thereof.

5. A metal expansion anchor sleeve, comprising a sheet-metal sleeve body open along a generatrix thereof and having at least two radially outwardly expansible sections separated by a slot extending from one end of the sleeve body, said sleeve body also having a longitudinal passage for insertion of an expander member, and said sleeve body further having tongues each bent back upon the respective sections inwardly of said sleeve and forming a bight-shaped leading end portion, and each tongue having a first portion integral with said one end of the sleeve body and a tapered second free end portion which converges in direction away from said first portion so as to form a juncture intermediate said portions, said second portion having a substantially planar facet which extends over the length of said second portion and which faces and engages the inner surface of said passage defining a tapered continuation thereof the respective tongue being bent back through an arc of more than 180° providing unobstructed entry of the expander member into said passage and forming an unobstructed hollow space intermediate said bight-shaped leading end and said juncture, whereby resilient yielding of the sleeve in the area of said unobstructed hollow space is obtained.

6. A metal expansion anchor sleeve as defined in claim 5, wherein each of said second free end portions has a thickness which decreases uniformly over the entire length of the second portion.

7. A metal expansion anchor sleeve as defined in claim 5, wherein each of said second free end portions has a width which decreases uniformly over the entire length of said second portion in direction away from said first portion.

8. A metal expansion anchor sleeve as defined in claim 5, wherein each bight-shaped end portion has a radius of curvature equal to at least one-half of the thickness of a respective section.

9. A metal expansion anchor sleeve as defined in claim 5, wherein said facets are in surface-to-surface contact with the inner surface of said passage.

* * * * *